United States Patent
Chamberlin et al.

(10) Patent No.: US 8,546,982 B2
(45) Date of Patent: Oct. 1, 2013

(54) ELECTRIC MACHINE MODULE COOLING SYSTEM AND METHOD

(75) Inventors: Bradley D. Chamberlin, Pendleton, IN (US); James J. Ramey, Fortville, IN (US); Alex S. Creviston, Muncie, IN (US)

(73) Assignee: Remy Technologies, LLC, Pendleton, IN (US)

(*) Notice: Subject to any disclaimer, the term of this patent is extended or adjusted under 35 U.S.C. 154(b) by 0 days.

(21) Appl. No.: 13/181,264

(22) Filed: Jul. 12, 2011

(65) Prior Publication Data

US 2013/0015728 A1  Jan. 17, 2013

(51) Int. Cl.
*H02K 9/00* (2006.01)

(52) U.S. Cl.
USPC ............ 310/52; 310/54; 310/58; 310/64

(58) Field of Classification Search
USPC .............. 310/52, 54, 55, 59, 60 A, 58, 64, 310/89
See application file for complete search history.

(56) References Cited

U.S. PATENT DOCUMENTS

| | | |
|---|---|---|
| 2,080,678 A | 5/1937 | Van Horn et al. |
| 2,264,616 A | 12/1941 | Buckbee |
| 3,447,002 A | 5/1969 | Ronnevig |
| 3,525,001 A | 8/1970 | Erickson |
| 3,748,507 A | 7/1973 | Sieber |
| 4,038,570 A | 7/1977 | Durley, III |
| 5,081,382 A | 1/1992 | Collings et al. |
| 5,180,004 A | 1/1993 | Nguyen |
| 5,207,121 A | 5/1993 | Bien |
| 5,293,089 A | 3/1994 | Frister |
| 5,372,213 A | 12/1994 | Hasebe et al. |
| 5,519,269 A | 5/1996 | Lindberg |
| 5,616,973 A | 4/1997 | Khazanov |
| 5,859,482 A | 1/1999 | Crowell et al. |
| 5,923,108 A | 7/1999 | Matake et al. |
| 5,937,817 A | 8/1999 | Schanz et al. |
| 5,965,965 A | 10/1999 | Umeda et al. |
| 6,011,332 A | 1/2000 | Umeda et al. |

(Continued)

FOREIGN PATENT DOCUMENTS

| | | |
|---|---|---|
| JP | 42007003 | * 3/1967 |
| JP | 05-103445 A | 4/1993 |

(Continued)

OTHER PUBLICATIONS

Machine Translaton JP07336946 (1995) JP2004343857 (2004) JP08251872 (1996).*

(Continued)

*Primary Examiner* — Tran Nguyen
*Assistant Examiner* — Jose Gonzalez Quinones
(74) *Attorney, Agent, or Firm* — Greenberg Traurig LLP

(57) ABSTRACT

Embodiments of the invention provide an electric machine module comprising a module housing. In some embodiments, the module housing can include a sleeve member and at least one end cap. Also, an inner wall of the module housing can at least partially define a machine cavity. In some embodiments a coolant jacket can be positioned within a portion of the sleeve member. Further, in some embodiments, at least one partition can be positioned substantially within the coolant jacket. The partition can be dimensioned to at least partially seal a first region of the coolant jacket from a second region of the cooling jacket.

20 Claims, 4 Drawing Sheets

(56) References Cited

U.S. PATENT DOCUMENTS

| | | |
|---|---|---|
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Masegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 2003/0222519 A1 | 12/2003 | Bostwick |
| 2004/0036367 A1 | 2/2004 | Denton et al. |
| 2004/0189110 A1 | 9/2004 | Kazumasa |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0098768 A1* | 5/2008 | Masoudipour et al. ......... 62/505 |
| 2008/0195924 A1* | 8/2008 | Masoudipour et al. ....... 715/200 |
| 2008/0223557 A1 | 9/2008 | Fulton et al. |
| 2009/0174278 A1 | 7/2009 | Sheaffer et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 05-292704 A | 11/1993 |
| JP | 06-036364 U | 5/1994 |
| JP | 06-311691 A | 11/1994 |
| JP | 07-264810 A | 10/1995 |
| JP | 07336946 A * | 12/1995 |
| JP | 08-019218 A | 1/1996 |
| JP | 08251872 A * | 9/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2004343857 A * | 12/2004 |
| JP | 2005-012989 A | 1/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 2008-544733 A | 12/2008 |
| JP | 2009-247084 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report, Received Jul. 31, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

ELECTRIC MACHINE MODULE COOLING SYSTEM AND METHOD

BACKGROUND

Electric machines, often contained within a machine cavity of a housing, generally include a stator and a rotor, and an air gap between the rotor and the stator. During operation of electric machines, a considerable amount of heat energy can by generated by both the stator and the rotor, as well as other components of the electric machine. Some cooling methods can include removing the generated heat energy by circulating a coolant through walls of the housing or dispersing a coolant throughout the machine cavity of the housing.

For some electric machines, draining the coolant from the machine cavity can present difficulties. In some machine housings, the coolant may not drain fast enough causing coolant to accumulate within the housing. In some machines, if the level of coolant is too great, a portion of the coolant can enter the air gap between the rotor and the stator, which can lead to higher spin losses, decreases in machine output, integration of air within the coolant, and other disadvantages.

SUMMARY

Some embodiments of the invention provide an electric machine module comprising a module housing. In some embodiments, the module housing can include a sleeve member and at least one end cap. An inner wall of the module housing can at least partially define a machine cavity. In some embodiments, a coolant jacket can be positioned within at least a portion of the sleeve member. Further, in some embodiments, at least one partition can be positioned substantially within the coolant jacket. The partition can be dimensioned to at least partially seal a first region of the coolant jacket from a second region of the cooling jacket.

Some embodiments of the invention provide an electric machine module comprising a module housing. In some embodiments, the module housing can include a sleeve member and at least one end cap. An inner wall of the module housing can at least partially define a machine cavity. In some embodiments a coolant jacket can be positioned within at least a portion of the sleeve member, and the coolant jacket can include a first region and a second region. In some embodiments, the first region can be at least partially sealed from the second region. Also, in some embodiments, at least one inlet can be operatively coupled to a portion of the sleeve member adjacent to a portion of the first region of the cooling jacket.

Some embodiments of the invention provide a method for cooling an electric machine module. In some embodiments, the method comprises providing a module housing including an inner wall at least partially defining a machine cavity, a sleeve member, and at least one end cap. The method can further comprise positioning a coolant jacket within a portion of the sleeve member and partitioning the coolant jacket into a first region and a second region. In some embodiments, the two regions can be at least partially sealed from each other. Some embodiments can provide positioning a plurality of coolant apertures through a portion of the inner wall so that at least the first region of the coolant jacket is in fluid communication with the machine cavity.

DETAILED DESCRIPTION

Figure 1:
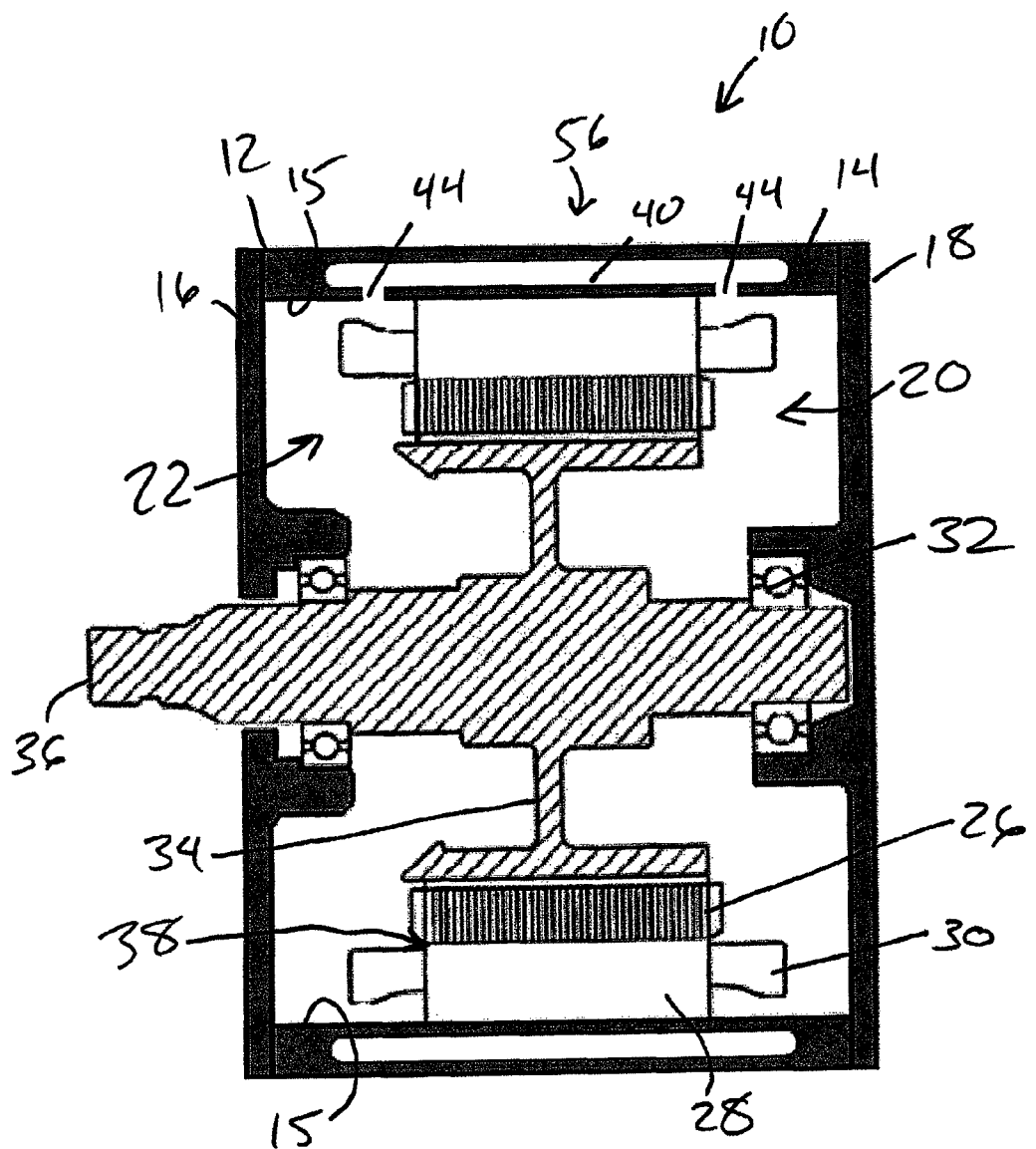
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates an electric machine module 10 according to one embodiment of the invention. The module 10 can include a module housing 12 comprising a sleeve member 14, a first end cap 16, and a second end cap 18. An electric machine 20 can be housed within a machine cavity 22 at least partially defined by an inner wall 15 of the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments the housing 12 can comprise a substantially cylindrical canister and a single end cap (not shown). Further, in some embodiments, the module housing 12, including the sleeve member 14 and the end caps 16, 18, can be fabricated from materials that can generally include thermally conductive properties, such as, but not limited to aluminum or other metals and materials capable of generally withstanding operating temperatures of the electric machine.

In some embodiments, the sleeve member 14 can comprise different structures. In some embodiments, the sleeve member 14 can comprise a substantially unitary structure. More specifically, the sleeve member 14 can be manufactured so that at least a portion of the elements of the sleeve member 14 are substantially integral with each other. For example, in some embodiments, the sleeve member 14 can be manufactured using casting, molding, extruding, and other similar manufacturing techniques. As a result, in some embodiments, the structure of the sleeve member 14 can be cast, molded, or extruded at about the same time so that the sleeve member 14 comprises a substantially unitary structure.

In other embodiments, the sleeve member 14 can comprise substantially separate components. For example, in some embodiments, the sleeve member 14 can include an inner sleeve member 24 and an outer sleeve member (not shown). In some embodiments, the inner sleeve member 24 and the outer sleeve member can be manufactured at different times and can be assembled at a time after manufacture. In some embodiments, the inner sleeve member 24 can be substantially fit around an outer diameter of a portion of the electric machine 20. In some embodiments, the inner sleeve member 24 and the outer sleeve member can be operatively coupled together in the module 10 assembly process. In some embodiments, the inner and outer sleeve members can be operatively coupled so that the coupling between the elements comprises a substantially liquid-tight seal. In other embodiments, the sleeve member 14 can comprise other configurations.

The electric machine 20 can include a rotor 26, a stator assembly 28, including stator end turns 30, and bearings 32, and can be disposed about an output shaft 36. As shown in FIG. 1, the stator 28 can substantially circumscribe a portion of the rotor 26. In some embodiments, the electric machine 20 can also include a rotor hub 34 or can have a "hub-less" design (not shown). In some embodiments, a radial air gap 38 can be defined substantially between the stator assembly 28 and the rotor 26.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to, the rotor 26, the stator assembly 28, and the stator end turns 30 can generate heat during operation of the electric machine 20. These components can be cooled to increase the performance and the lifespan of the electric machine 20.

As shown in FIG. 1, in some embodiments, at least a portion of the sleeve member 14 can comprise a coolant jacket 40. In some embodiments, the coolant jacket 40 can substantially circumscribe a portion of the electric machine 20. More specifically, in some embodiments, the coolant jacket 40 can substantially circumscribe a portion of an outer diameter of the stator assembly 28, including the stator end turns 30.

Depending on the sleeve member 14 configuration, in some embodiments, the coolant jacket 40 can be at least partially created during manufacture of the sleeve member 14. For example, in some embodiments, the sleeve member 14 can be manufactured (i.e., cast, molded, extruded, etc.) so that the coolant jacket 40 is formed as a substantially integral element of the sleeve member 14. In some other embodiments, the coolant jacket 40 can be formed by the assembly of the sleeve member 14. For example, in some embodiments, the inner sleeve member 24 and the outer sleeve member can be operatively coupled together so that the coolant jacket 40 is defined between a portion of the two elements.

Further, in some embodiments, the coolant jacket 40 can contain a coolant that can comprise transmission fluid, ethylene glycol, an ethylene glycol/water mixture, water, oil, motor oil, or a similar substance. The coolant jacket 40 can be in fluid communication with a coolant source (not shown) which can pressurize the coolant prior to or as it is being dispersed into the coolant jacket 40, so that the pressurized coolant can circulate through the coolant jacket 40. Further, in some embodiments, at least one coolant inlet 42 can be positioned through a portion of the sleeve member 14 to fluidly connect the coolant source and the coolant jacket 40.

In some embodiments, the sleeve member 14 can comprise coolant apertures 44. In some embodiments, the coolant apertures 44 can extend through a portion of the sleeve member 14 to fluidly connect the coolant jacket 40 and the machine cavity so that a portion of the coolant can flow from the coolant jacket 40 into the machine cavity 22. In some embodiments, the coolant apertures 44 can be positioned substantially adjacent to the stator end turns 28. For example, in some embodiments, as the pressurized coolant circulates through the coolant jacket 40, at least a portion of the coolant can exit the coolant jacket 40 through the coolant apertures 44 and enter the machine cavity 22. Also, in some embodiments, the coolant can contact the stator end turns 30, which can provide at least partial cooling. After exiting the coolant apertures 44, at least a portion of the coolant can flow through the machine cavity 22 and can contact various module 10 elements, which, in some embodiments, can provide at least partial cooling of some components of the module 10.

According to some embodiments of the invention, the coolant jacket 40 can include multiple configurations. In some embodiments, at least a portion of the coolant jacket 40 can extend through the sleeve member 14 a distance substantially similar to an axial length of the stator assembly 28. For example, in some embodiments, an axial length of a portion of the coolant jacket 40 can extend at least the same distance as the axial length of the stator assembly 28, including the stator end turns 30. In some embodiments, portions of the coolant jacket 40 can extend greater and lesser axial distances, as desired by manufacturers and/or end users for cooling.

Figure 4:
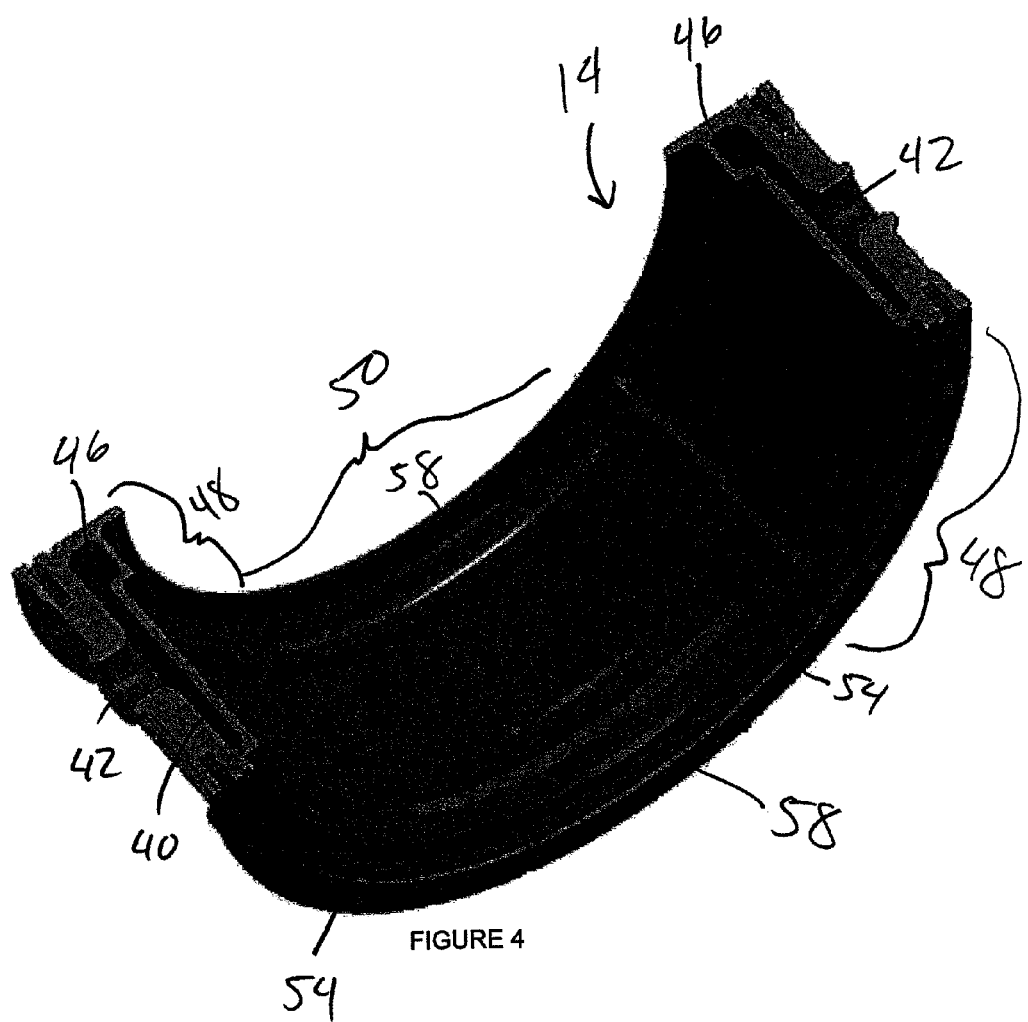
FIG. 4 is a partial cross-sectional view of a sleeve member according to one embodiment of the invention.

In some embodiments, a portion of the coolant jacket 40 also can comprise at least one radially inward extension 46. For example, as shown in FIG. 4, in some embodiments, a region of the sleeve member 14 can be substantially radially recessed so that the radially inward extension 46 of the coolant jacket 40 can be substantially adjacent to at least one of the stator end turns 30. In some embodiments, radially inward extensions 46 can be positioned adjacent to one of (as shown in FIG. 4), both of, or neither of the stator end turns 30. Further, in some embodiments, the coolant jacket 40 can comprise radially inward extensions 46 substantially continuously around at least a portion of an outer diameter of at least one of the stator end turns 30 (i.e., one continuous radially inward extension around a portion of at least one of the stator end turns 28). In other embodiments, the coolant jacket 40 can comprise substantially discrete radially inward extensions 46 positioned around at least a portion of an outer diameter of at least one of the stator end turns 30.

In some embodiments, the stator end turns 30 can comprise a generally lesser outer diameter compared to the stator assembly 28, and, as a result, a greater distance can exist between the stator end turns 30 and the cooling jacket 40. In some embodiments, the radially inward extensions 46 of the coolant jacket 40 can enhance module 10 cooling because some of the coolant can circulate relatively closer to the stator end turns 30, compared to embodiments substantially lacking the radially inward extension 46. As a result, in some embodiments, a distance between the coolant and an area rejecting heat energy (i.e., the stator end turns) can be generally minimized, which can lead to generally increased heat energy transfer.

According to some embodiments, the coolant jacket 40 can comprise at least two different regions. In some embodiments, the coolant jacket 40 can comprise at least a first region 48 and a second region 50, although in other embodiments, the coolant jacket 40 can comprise more than the first and second regions. In some embodiments, the first region 48 can be at least partially sealed with respect to the second region 50.

Figure 2:
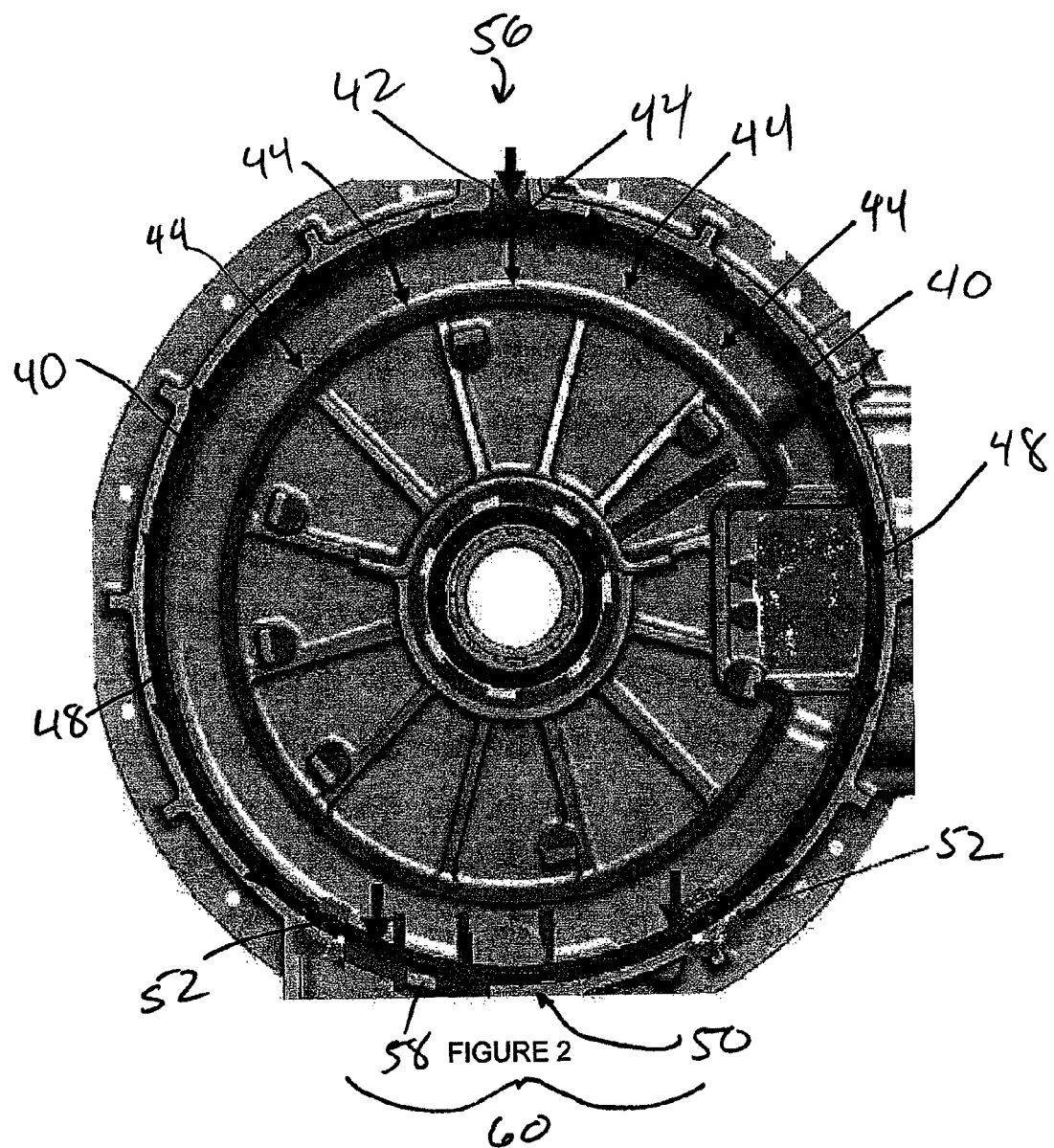
FIG. 2 is an interior end view of portions of an electric machine module according to one embodiment of the invention.
Figure 3:
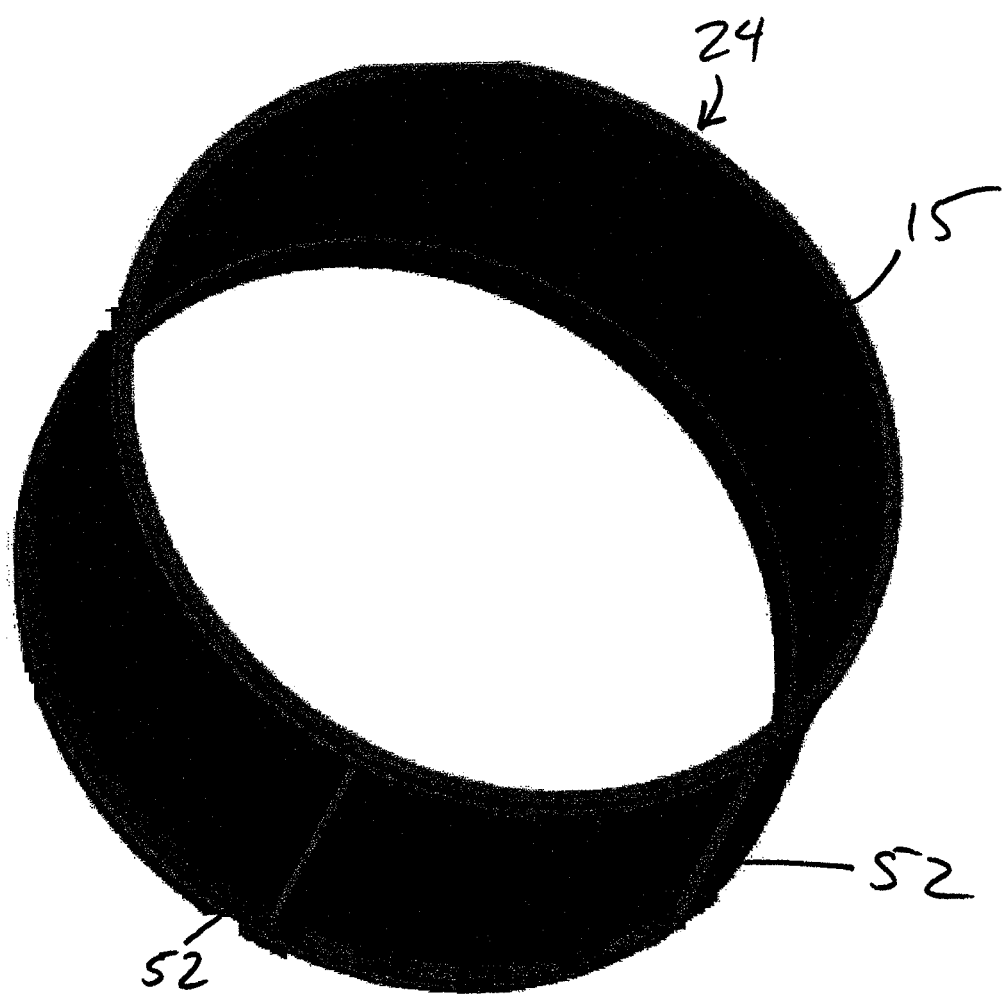
FIG. 3 is a perspective view of an inner sleeve member and partitions according to one embodiment of the invention.

In some embodiments, at least one partition 52 can be positioned within a portion of the coolant jacket 40 in both axial and radial directions to at least partially define the first region 48 and the second region 50. In some embodiments, more than one partition 52 can be used to form the first region 48 and the second region 50, as shown in FIGS. 2 and 3. In some embodiments, the partitions 52 can at least partially seal the first region 48 from the second region 50. In some embodiments, the partitions 52 can substantially seal the first region 48 from the second region 50 so that material amounts of coolant do not pass through and/or around the partitions 52 from the first region 48 to the second region 50, and vice versa. Further, in some embodiments, the partitions 52 can be fabricated from a variety of materials, including but not limited to metals (i.e., steel, aluminum, iron, copper, etc), polymeric materials, and other similar materials.

In some embodiments, the partitions 52 can be positioned substantially within coolant jacket 40 in different manners. In some embodiments, partitions 52 can be integral with the sleeve member 14. For example, in some embodiments, the sleeve member 14 can be manufactured (i.e., casting, molding, extruding, etc.) so that the partitions 52 are a substantially integral feature of the sleeve member 14 (i.e., the partitions can be an element of the sleeve member 14). Also, in some embodiments, the partitions 52 can be operatively coupled to an outside diameter of the inner sleeve member 24. For example, in some embodiments, the partitions 52 can be coupled to a portion of the inner sleeve member 24 using welding, brazing, adhesives, or similar methods. In some embodiments, the outside diameter of the inner sleeve member 24 can be milled and at least one of the partitions 52 can be inserted into the milled recess of the inner sleeve member 24. In some embodiments, the partitions 52 can at least partially provide support to the stator assembly 28 and the sleeve member 14.

As shown in FIG. 4, in some embodiments, the sleeve member 14 can comprise partition apertures 54 dimensioned to receive the partitions 52. In some embodiments, the partition apertures 54 can be machined through a portion of the sleeve member 14 so that after manufacture, the partitions 52 can be inserted through apertures 54 and can extend through at least a portion of the coolant jacket 40. For example, in some embodiments, the partition apertures 54 can be machined through the sleeve member 14 and the partitions 52 can then be inserted through the apertures 54 to at least partially seal the first region 48 relative to the second region 50. In some embodiments, the partitions 52 can include elements that can substantially seal the partition apertures 54 after insertion. In some other embodiments, after insertion, the partition apertures 54 can be sealed by other methods such as by using a plug-like structure or coupling a cover (not shown) over the apertures 54 to substantially seal the apertures 54 from the machine cavity 22.

In some embodiments, the partitions 52 can at least partially seal the first region 48 from the second region 50. For example, in some embodiments, the partitions 52 can occupy a substantial portion of the coolant jacket 40 in both axial and radial directions to substantially restrict coolant flow between the first region 48 and the second region 50. In some embodiments, the partitions 52 can be configured so that a relatively small volume of coolant can flow between the two regions 48, 50. In other embodiments, the partitions 52 can be configured to substantially seal the first region 48 from the second region 50 so that no material amounts of coolant flow between the two regions 48, 50.

In some embodiments, the partitions 52 can be angularly spaced apart. In some embodiments, the partitions 52 can be placed between about 22 degrees to about 300 degrees apart. More specifically, in some embodiments, the partitions 52 can be positioned between 22 and 180 degrees apart. For example, in some embodiments, the partitions 52 can be positioned about 90 degrees apart so that about 270 degrees (or 90 degrees, depending on the orientation) of the coolant jacket 40 comprises either the first region 48 or the second region 50. In some embodiments, the first region 48 comprises about 270 degrees of the coolant jacket 40, and, as a result, the second region 50 comprises about 90 degrees of the coolant jacket 40. As previously mentioned, the partitions 52 can be positioned in a variety of angles relative to each other, and as a result, the relative sizes of the first region 48 and the second region 50 can vary accordingly.

In some embodiments, the coolant inlet 42 can be in fluid communication with at least the first region 48. In some embodiments, the coolant inlet 42 can be positioned substantially at or adjacent to a top portion 56 of the sleeve member 14 and in fluid communication with at least the first region 48. As a result, in some embodiments, as shown in FIG. 2, the coolant can be introduced through the coolant inlet 42 positioned substantially at the top portion of the sleeve member 14 can flow generally downward through the coolant jacket 40. In some embodiments, portions of the coolant can exit the coolant jacket 40 through the coolant apertures 44, as previously mentioned, which also can be positioned adjacent to the first region 48 of the coolant jacket 40. Also, other portions of the coolant can remain within the coolant jacket 40 and flow through the remainder of the first region 48. In some embodiments, while flowing though the coolant jacket 40, the coolant can receive a portion of the heat energy radiated by the module 10.

In some embodiments, the sleeve member 14 can comprise at least one coolant aperture positioned adjacent to at least one of the partitions 52 (not shown). In some embodiments, the coolant aperture 44 can be positioned through the sleeve member 14 so that the coolant jacket 40 and the machine cavity 22 are in fluid communication. In some embodiments, the coolant aperture adjacent to the partition 52 can serve to direct coolant toward the electric machine 20. In some embodiments, the sleeve member 14 can comprise the coolant apertures 44, as previously mentioned, and the coolant aperture adjacent to the partition 52 so that volumes of coolant can exit the sleeve member 14 through at least both locations to aid in cooling different portions of the electric machine 20. Further, in some embodiments where the first region 48 is substantially sealed relative to the second region 50, the coolant aperture adjacent the partition 52 can function as an outlet for at least a portion of the coolant in the coolant jacket 40.

Furthermore, in some embodiments, at least a portion of the coolant can flow around and/or through the partitions 52. As previously mentioned, in some embodiments, the partitions 52 can either substantially seal the regions 48, 50 or can allow a volume of coolant to pass between regions 48, 50. In some embodiments, at least a portion of the coolant in the coolant jacket 40 can flow past at least one of the partitions 52 so that the portion of the coolant can exit the first region 48.

According to some embodiments of the invention, the sleeve member 14 can comprise at least one drain aperture 58 generally at or near a bottom of the module 10. As shown in FIG. 4, the sleeve member 14 can comprise more than one drain aperture 58, including two drain apertures 58. In some embodiments, the drain apertures 58 can be positioned through the sleeve member 14 substantially adjacent to the second region 50 of the coolant jacket 40, although in other embodiments, the drain apertures 58 can be positioned adjacent to other regions of the coolant jacket 40. In some embodiments, the drain apertures 58 can be positioned at the axial edges of the sleeve member 14. In other embodiments, the drain apertures 58 can be positioned along other portions of the sleeve member 14. Moreover, in some embodiments, the drain apertures 58 can comprise elongated, slot-like apertures to maximize the flow of coolant therethrough. In some embodiments, the drain apertures 58 can comprise other forms to suit manufacturers and/or end users' requirements for coolant flow.

Additionally, in some embodiments, the drain apertures 58 can span an angular portion of the sleeve member 14 to help drain the coolant when the module 10 is tipped. In some embodiments, the drain apertures 58 can extend along a significant portion of the sleeve member 14 between the partitions 52 (i.e., the second region 50). In some embodiments, the drain apertures 58 can extend a distance along the sleeve member 14 substantially equal to the angle of the second region 50 (e.g., the second region 50 and the drain apertures 58 each comprise about 90 degrees of the sleeve member 14). As a result, in some embodiments, as the module 10 tips during operation, coolant can still enter the drain apertures 58 so that a substantial amount of coolant does not enter the radial air gap 38. In other embodiments, the drain apertures 58 can extend a distance along the sleeve member 14 different than the angle of the second region 50. Further, in some embodiments, in lieu of generally smaller numbers of larger drain apertures 58, the sleeve member 14 can comprise a larger number of smaller drain apertures 58.

In some embodiments, the drain apertures 58 can fluidly connect to a drain system 60. Accordingly, coolant can enter the module 10 through the coolant inlet 42 and can begin circulation through the coolant jacket 40. In some embodiments, at least a portion of the coolant can enter the machine cavity 22 and contact the stator end turns 30 and other elements of the module 10 to aid in cooling via the coolant apertures 44. After entering the machine cavity 22, the coolant can flow over some of the elements of the module 10 and can flow in a generally downward direction due to gravity. Meanwhile, in some embodiments, the coolant in the coolant jacket 40 can flow through the remainder of the first region 48 toward the partitions 52. In some embodiments, another portion of the coolant can exit the coolant jacket 40 through the at least one coolant aperture positioned near the partitions 52. After exiting the coolant jacket 40, the coolant can contact elements of the module 10 to aid in cooling and also can flow in a generally downward direction due to gravity. In some embodiments, at least a portion of the coolant can flow through the drain apertures 58 and enter the second region 50, as previously mentioned. In some embodiments, the second region 50 can fluidly connect the drain apertures 58 to the drain system 60 so that coolant can flow through the apertures 58, enter the second region 50 of the coolant jacket 40, and then exit the module 10 via the drain system 60.

In some embodiments, the drain system can be in fluid communication with a heat exchange element, such as a radiator. In some embodiments, after entering the drain system, at least a portion of the coolant can circulate to the heat exchange element where at least a portion of the heat energy received by the coolant can be removed. Then, at least some of the coolant can be recirculated for further cooling.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
a module housing including a sleeve member and at least one end cap, an inner wall of the module housing at least partially defining a machine cavity;
a cooling jacket positioned within a portion of the sleeve member; and
at least one partition positioned substantially axially extending across at least a majority of an axial length of the sleeve member within the cooling jacket and dimensioned to substantially seal a first coolant cavity region of the cooling jacket from a second coolant cavity region of the cooling jacket,
the first coolant cavity region extending around a majority of a circumference of the cooling jacket and coupled upstream of the machine cavity to receive a pressurized coolant flow prior to the machine cavity, the first coolant cavity region being in fluid communication with the machine cavity to enable coolant passage into the machine cavity; and
the second coolant cavity region fluidly coupled downstream of the machine cavity and the partition.

2. The electric machine module of claim 1, wherein the sleeve member comprises coolant apertures positioned through a portion of the inner wall immediately adjacent a portion of the first coolant cavity region of the cooling jacket, and the coolant apertures are in fluid communication with at least the first coolant cavity region of the cooling jacket and the machine cavity.

3. The electric machine module of claim 1, wherein the sleeve member comprises at least one drain aperture positioned through a portion of the inner wall immediately adjacent a portion of the second coolant cavity region of the cooling jacket, the at least one drain aperture in fluid communication with the machine cavity.

4. The electric machine module of claim 1, and further comprising an electric machine positioned in the machine cavity at least partially enclosed by the module housing, the electric machine including a stator assembly, the stator assembly comprising stator end turns; and wherein the sleeve member comprises coolant apertures positioned through a portion of the inner wall immediately adjacent a portion of the first coolant cavity region of the cooling jacket and proximal to at least one of the stator end turns, the coolant apertures in fluid communication with at least the first coolant cavity region of the cooling jacket and the machine cavity.

5. The electric machine module of claim 4, wherein an axial length of a portion of the coolant jacket is at least substantially equal to an axial length of the stator assembly.

6. The electric machine module of claim 4, wherein the coolant jacket comprises at least one radially inward extension adjacent at least one of the stator end turns.

7. The electric machine module of claim 1, wherein the sleeve member comprises a cast material.

8. The electric machine module of claim 1, wherein the sleeve member comprises an inner sleeve member operatively coupled to an outer sleeve member.

9. The electric machine module of claim 1, wherein the sleeve member comprises at least one coolant aperture positioned through a portion of the inner wall adjacent the at least one partition, the at least one coolant aperture in fluid communication with at least the cooling jacket and the machine cavity.

10. The electric machine module of claim 1, and further comprising two partitions, wherein the two partitions are positioned in the cooling jacket about 22 degrees to about 180 degrees apart.

11. An electric machine module comprising:
- a module housing including a sleeve member and at least one end cap, an inner wall of the sleeve member at least partially defining a machine cavity,
- the sleeve member including at least one partition;
- a coolant jacket positioned within the sleeve member,
  - the coolant jacket including a first coolant cavity region and second coolant cavity region, wherein
  - the first coolant cavity region is substantially sealed from the second coolant cavity region
  and,
- the first coolant cavity region extending around a majority of the cooling jacket circumference and coupled upstream of the machine cavity to receive a pressurized coolant flow prior to the machine cavity, the first coolant cavity region being in fluid communication with the machine cavity to enable coolant passage into the machine cavity;
- the second coolant cavity region fluidly coupled downstream of the machine cavity and the partition; and
  - at least one inlet operatively coupled to a portion of the sleeve member adjacent to a portion of the first coolant cavity region of the coolant jacket, the at least one inlet in fluid communication with the coolant jacket.

12. The electric machine module of claim 11, and further comprising at least one drain aperture positioned through a portion of the inner wall immediately adjacent a portion of the second coolant cavity region of the cooling jacket, the at least one drain aperture in fluid communication with the machine cavity.

13. The electric machine module of claim 11, wherein the at least one partition is positioned substantially axially extending across at least a majority of an axial length of the sleeve member within the coolant jacket to seal the first coolant cavity region relative to the second coolant cavity region.

14. The electric machine module of claim 13, and further comprising two partitions positioned substantially axially extending across at least a majority of an axial length of the sleeve member within the coolant jacket to substantially seal the first coolant cavity region relative to the second coolant cavity region, wherein the two partitions are positioned in the cooling jacket about 22 degrees to about 180 degrees apart.

15. The electric machine module of claim 13, wherein the sleeve member comprises at least one coolant aperture positioned through a portion of the inner wall adjacent the at least one partition, the at least one coolant aperture in fluid communication with at least the cooling jacket and the machine cavity.

16. The electric machine module of claim 11, wherein the coolant jacket comprises at least one radially inward extension.

17. The electric machine module of claim 11, wherein the sleeve member comprises a cast material.

18. The electric machine module of claim 11, wherein the sleeve member comprises an inner sleeve member operatively coupled to an outer sleeve member.

19. A method for cooling an electric machine module, the method comprising:
- providing a module housing comprising an inner wall, a sleeve member and at least one end cap, the inner wall at least partially defines a machine cavity;
- positioning a coolant jacket within a portion of the sleeve member;
- providing at least one partition positioned substantially axially extending across at least a majority of an axial length of the sleeve member within the cooling jacket and partitioning the coolant jacket into a first coolant cavity region and a second coolant cavity region so that the first coolant cavity region is substantially sealed with from the second coolant cavity region,
- the first coolant cavity region extending around a majority of the cooling jacket circumference and coupled upstream of the machine cavity to receive a pressurized coolant flow prior to the machine cavity;
- positioning a plurality of coolant apertures through a portion of the inner wall so that at least the first coolant cavity region of the coolant jacket is in fluid communication with the machine cavity; and
- providing a second coolant cavity region fluidly coupled downstream of the machine cavity and the partition.

20. The method of claim 19 and further comprising positioning at least one drain aperture through a portion of the inner wall immediately adjacent a portion of the second coolant cavity region of the cooling jacket, the at least one drain aperture in fluid communication with the machine cavity.

* * * * *